United States Patent [19]

Jeunhomme

[11] Patent Number: 4,843,233

[45] Date of Patent: Jun. 27, 1989

[54] DEVICE FOR DETECTING VIBRATIONS INCLUDING A MULTIMODE OPTICAL FIBER AS SENSITIVE ELEMENT

[75] Inventor: Luc Jeunhomme, Fontenay Le Fleury, France

[73] Assignee: Photonetics S.A., Marly Le R, France

[21] Appl. No.: 192,003

[22] Filed: May 9, 1988

[30] Foreign Application Priority Data

May 11, 1987 [FR] France ................................ 87 06568

[51] Int. Cl.⁴ .............................................. H01J 5/16
[52] U.S. Cl. ................... 250/227; 250/231 R
[58] Field of Search ............ 250/227, 231 R; 350/96.1; 73/705, 800, 655, 656, 657, 517 R

[56] References Cited

U.S. PATENT DOCUMENTS 4,443,698 4/1984 Schiffner ............................ 250/227
4,749,246 6/1988 Epworth et al. ................... 250/227

Primary Examiner—David C. Nelms
Attorney, Agent, or Firm—Helfgott & Karas

[57] ABSTRACT

A vibration detection device is provided having multimode optical fiber as sensitive element; a coherent light source; photodetecting means; means for analyzing the output of the photodetector means; a monomode optical fiber disposed between the coherent light source and the first end of the multimode optical fiber forming the input face thereof; and at least one optical fiber, whose core diameter is smaller than that of the multimode optical fiber, disposed between the other end of the multimode optical fiber, forming the output face thereof and on which a speckle appears, and the photodetector means.

8 Claims, 1 Drawing Sheet

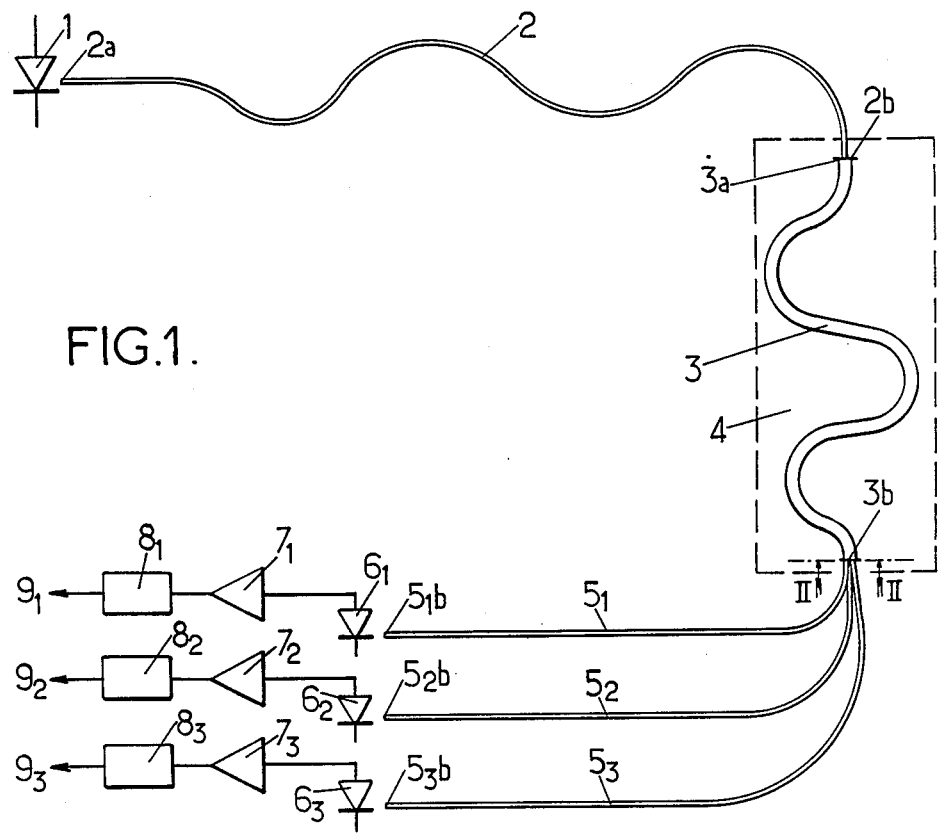
FIG.1.
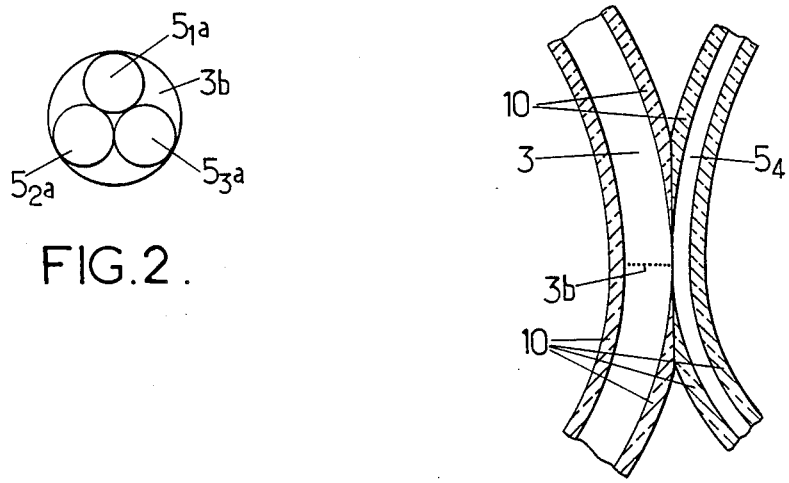
FIG.2.
FIG.3.

DEVICE FOR DETECTING VIBRATIONS INCLUDING A MULTIMODE OPTICAL FIBER AS SENSITIVE ELEMENT

The present invention relates to a vibration detection device comprising a multimode optical fiber as sensitive element, used more particularly for analysing the vibrations of machines (such as motors and other rotary machines) and structures (such as electric transformers and mechanical structures), for detecting intrusions (more particularly perimetric intrusions), for detecting the removal of objects, for monitoring the breathing of patients, for constructing trips for switching on lighting and/or alarms in response to the appearance of vibrations or the variation of their frequency.

The device of the invention uses, as sensitive element detecting vibrations or the modification of the vibration frequency, a multimode optical fiber one of the ends of which is illuminated by a coherent light source and the illumination of the other end of which is observed by means of a photo-detector.

It is in fact known, for example from the book entitled "Optical fiber communication systems", by C. P. Sandbank, published by John Wilely & Son of New York, 1980, pp 249-265, that in a multimode optical fiber, illuminated at a first end forming an input face by a coherent light, the light follows different optical paths and that in each optical path the light is modulated differently by external disturbances, such as vibrations, temperature and/or pressure variations. The result is then at the other end forming the output face, of the optical fiber that the modes of the multimode optical fiber are combined so as to form an interference pattern with a granular mottled appearance, called "speckle".

This speckle phenomenon is considered as unfavorable in optical transmission systems for it produces a "modal noise" which adversely affects the performance of such transmission systems.

On the other hand, it has been considered possible to use the speckle induced by variations to form multimode optical fiber sensors, —either for measuring a fluid flow by placing a multimode optical fiber in the fluid stream whose flow it is desired to measure, the fluid flow generating vibrations which produce, at the output of the multimode optical fiber when it is illuminated at its input by a coherent light, a speckle which is observed and analysed; in particular J. H. Lyle and C. W. Pitt have described in "Electronics Letters" of the Mar. 19, 1981, vol. 17, no 6, pp244-245, a flow meter which comprises a helium-neon laser emitting coherent light which excites the input end of the multimode optical fiber passing through a duct through which flows the fluid whose rate it is desired to measure; the speckle, formed at the output end of the multimode optical fiber by the vibrations produced in the vicinity of the fiber by flow of the fluid through the duct, is observed by a photodetector disposed at 15 cm from this output end, the output signal of the photodetector being displayed on an audio-frequency spectrum analyser;

—or for detecting intrusion in a zone to be protected, by disposing multimode optical fiber in a loop almost closed about this zone; thus Chung-yee Leung, I-fan Chang and Si-Hsu have described, in the "Proceedings of the Fourth International Conference on Optical Fiber Sensors" Tokyo Oct. 7-9, 1986, an intrusion detection device comprising a laser whose light is focused on the input end of the multimode optical fiber disposed in a practically closed loop and whose speckle, appearing on the output face of this fiber, is detected by several photodetectors of small size disposed in the vicinity of the center of the speckle, the output signals of the photodetectors, being amplified, filtered (by band-pass filters of 10 to 2000 Hz), rectified, added and blocked.

The invention has as object a device for detecting vibrations using, like those described above, a multimode optical fiber but it is distinguished therefrom by the fact that a monomode optical fiber is provided between the coherent light source and the input face of the multimode optical fiber and at least one optical fiber, having a core diameter smaller than that of the multimode optical fiber, is provided between the output face of this multimode optical fiber, on which the speckle, appears, and at least one associated photodetector.

The U.S. Pat. No. 4,297,887 by BUCARO further describes a sensor of acoustic vibrations in a fluid medium used for forming hydrophones. This sensor uses, as sensitive element, two optical fibers placed in parallel in the disturbing element. In each of these fibers, the external acoustic waves induce optical path length variations. In the interesting case where the two fibers are not strictly identical (the two possibilities mentioned by this patent are to use two fibers of different lengths or else to have one fiber protected by a sheath and the other unprotected), the optical path difference between the two fibers makes it possible, by recombining the optical waves, to obtain interferences due to the relative phase shift of the two waves.

This patent uses two different monomode fibers.

On the contrary, in accordance with the invention, a single multimode fiber in accordance with the element, the interferences obtained being due to different optical paths between the different optical modes propagating the fiber.

As state of the technique we may also mention an article by M. L Henning et al entitled "Optical fiber hydrophones with down lead insensitivity" published in Proceedings First International Conference on Optical Fiber Sensors, Apr. 26-28, 1983, pp. 23-27, IEE, London.

In the sensor described in this article the sensitive element is formed of a single optical fiber and two optical waves of slightly different optical frequencies are caused to interfere. We can then observe not interferences between the different guided modes but interferences between the two Waves, propagating in the same mode but having different optical frequencies. As in the above U.S. Pat. No. 4,297,887, the sensitive fiber is ideally monomode.

Finally, a reference article may also be mentioned which lays down the physical principles brought into play in optical fiber sensors, namely the article by M. R Layton and J. A. Bucaro entitled "Optical fiber acoustic sensor utilizing mode-mode interference" published in Applied Optics, vol. 18, No. 5, Mar. 1, 1979, pp 666-670, New York.

This article states a mathematical relation can be established giving the variation of the optical path length for a guided mode in an optical fiber as a function of the external pressure. The author concludes that it is possible to form a sensor based on this principle, but without giving any embodiment thereof using a reception fiber with a core diameter smaller than the core diameter of the sensitive fiber. In addition, the use of a sensitive fiber having a large number of guided modes is not touched on. Probably Bucaro contemplated rather a device according to his above mentioned American patent.

With respect to the whole of the above mentioned technique, the object of the invention is to provide a vibration detection device having an optical fiber sensitive element, a coherent light source, photodetecting means and means for analysing the output of the photodetector means, characterized by the fact that said sensitive element is formed by a single optical fiber of multimode type and by the fact that it further comprises a monomode optical fiber disposed between the coherent light source and the first end of the multimode optical fiber and at least one optical fiber, whose core diameter is smaller than that of the multimode optical fiber and which is disposed between the other end of the multimode optical fiber, forming the output face thereof and on which a speckle appears, and the photodetector means.

Preferably:

—the coherent light source is a laser diode;
—the photodetector means comprise at least one photodetector formed by a semiconductor photodetector diode;
—the multimode optical fiber comprises three guided modes;
—the device comprises several optical fibers whose core diameter is smaller than that of the multimode optical fiber, the photodetector means comprising a photodetector disposed opposite the end of each of these optical fibers with reduced core diameter opposite the one facing the output face of the multimode optical fiber;
—the single photodetector or each photodetector is followed by a preamplifier and a filter cutting off the low frequencies, formed advantageously by a high-pass filter, the single filter or the filters feeding into a frequency analyser.

The invention will in any case be well understood from the complement of description which follows as well as from the accompanying drawings, which complement and drawings are of course given solely by way of indication.

FIG. 1 is a general view of a device of the invention comprising three optical fibers with reduced core diameter.

FIG. 2 is a section through II—II, on a larger scale, of FIG. 1.

FIG. 3 illustrates a variant of the coupling between the multimode optical fiber forming the sensitive element of the device and an optical fiber with reduced core diameter.

According to the invention and more especially according to that one of its modes of application as well as those of its embodiments of the different parts to which it seems preference should be given, wishing for example to construct a vibrations detection device comprising a multimode optical fiber as sensitive element, the following is the way to set about it.

Referring first of all to FIG. 1 and accessorily to FIG. 2, a device of the invention comprises first of all a coherent light source 1, formed advantageously as illustrated by a laser diode of transverse monomode and longitudinal monomode type.

Opposite the emitting zone of the coherent light source 1 is disposed a first end 2a of a monomode optical fiber 2 whose second end 2b is disposed opposite an input end or face of a multimode optical fiber 3 which forms the sensitive element of the device and which is disposed in the zone 4 where the machine, the structure, the patient or the zone to be monitored is situated. A microlens (not shown) is used for focusing the light emitted by source 1 onto end 2a, whereas a connector or a splice (not shown) of known type may be advantageously disposed between ends 2b and 3a.

The coherent light emitted by the laser diode or source 1 and transmitted by the monomode optical fiber 2 to the end 3a of the multimode optical fiber 3, generates at the other end or output face 3b of fiber 3 a speckle or granular mottle comprising a mosaic of grains or light and dark zones, the appearance of the speckle, that is to say the luminosity of each grain or zone being modified by any vibration in zone 4 which acts on the multimode optical fiber 3.

It would generally be sufficient to observe a single grain of the speckle, but it is advantageous, for increasing the signal/noise ratio to observe several grains thereof. This observation is carried out, according to a characteristic of the invention, not directly at end 3b but at a distance using, for the remote transmission, one or preferably several optical fibers formed by one or more monomode optical fibers and/or by one or more multimode optical fibers having a core diameter smaller than the core diameter of the multimode optical fiber 3.

In the embodiment shown in FIG. 1, three monomode optical fibers have been provided $5_1$, $5_2$, $5_3$ and in FIG. 2 can be seen the core section at the level of the output face 3b of the multimode optical fiber 3 and the core sections of the three ends or input faces $5_1a$, $5_2a$, $5_3a$ of the optical fibers $5_1$, $5_2$, $5_3$ respectively.

The other face or output face $5_1b$, $5_2b$, $5_3b$ of the fiber $5_1$, $5_2$, $5_3$ respectively is disposed opposite a photodetector $6_1$, $6_2$, $6_3$ formed by a photodiode of the PIN or avalanche type. The photodiodes $6_1$, $6_2$, $6_3$ feed into preamplifiers $7_1$, $7_2$, $7_3$ respectively whose outputs are filtered by high-pass filters $8_1$, $8_2$, $8_3$ respectively, which suppress for example the frequencies less than 10 Hz.

Finally, the outputs $9_1$, $9_2$, $9_3$ of the high-pass filters $8_1$, $8_2$, $8_3$ are analysed in a spectrum analyser (not shown).

In the embodiment partially illustrated in FIG. 3, the multimode optical fiber 3 is coupled to a single monomode optical fiber $5_4$, not by its end (as in the case of the embodiment shown in FIGS. 1 and 2), but through a lateral coupler-separator, the core diameter of the monomode optical fiber $5_4$ being smaller than the core diameter of the multimode optical fiber 3. In FIG. 3, which is on a larger scale than the corresponding portion of FIG. 1 in the zone of section II—II, the polished sheaths 10 surrounding the core of each of fibers 3 and $5_4$ are shown in section.

At the other end (not visible in FIG. 3) of the optical fiber $5_4$ the same types of elements are provided as those illustrated in FIG. 1, namely a photodetector, a preamplifier and a high-pass filter whose output is analysed by a spectrum analyser.

Between the multimode optical fiber 3 and the reduced core diameter fibers, such as $5_1$, $5_2$, $5_3$, $5_4$, coupling systems may obviously be provided other than a connector or splice of the type illustrated in FIG. 1 or such as a polished fiber lateral coupler-separator of the type illustated in FIG. 2, for example a multimode coupler towards one or more monofibers, by melting and drawing.

In a device of the invention, the multimode optical fiber 3 is preferably of the index gradient type, although index jump multimode fibers may also be used.

Advantageously, the multimode fiber 3 is formed by a fiber of the type used in telecommunications with a core diameter of 50 μm and digital aperture of 0.2, or preferably by a fiber having three guided modes at the working wave length.

The device of FIG. 1 operates as follows.

The light produced by the laser diode or source 1 is transmitted by the monomode optical fiber 2 to the input end or face 3a of the multimode optical fiber 3. This coherent light is phase modulated, during its propagation through fiber 3, by an external disturbance, particularly by any vibration occuring in the zone 4, and it will be noted that the device of the invention has the advantage of providing not pin point detection but detection throughout the whole zone, which may be relatively extensive. This phase modulation, because the light follows several optical paths in a multimode optical fiber, produces an interference pattern on the other end or output face 3b of the multimode optical fiber 3, in the form of a speckle.

The variations of luminosity of three zones or grains of the speckle on the output face 3b are observed by the diode photodetector $6_1$, $6_2$, $6_3$, through the optical fibers $5_1$, $5_2$, $5_3$ which transmit the variations of luminosity of these three zones or grains. The outputs of the photodetectors $6_1$, $6_2$, $6_3$ are amplified by the preamplifier $7_1$, $7_2$, $7_3$; the high-pass filters $8_1$, $8_2$, $8_3$ eliminate the low frequencies which correspond to relatively slow temperature and pressure variations in zone 4; thus the outputs $9_1$, $9_2$, $9_3$ depend only on the vibrations which occur in zone 4 and the spectrum analyser which receives the outputs $9_1$, $9_2$, $9_3$ analyses these vibrations. These vibrations may be observed and/or cause a signal triggering an alarm and/or lighting, for example in the case of a breathing deficiency of a monitored patient, removal of objects in a museum or in a private collection, or an intrusion (in this latter case the multimode optical fiber 3 being either buried for external protection, or disposed under a carpet or in a door for monitoring penetration into an apartment or building.

The invention is essentially characterized by the presence of the optical fibers 2, on the one hand and $5_1$, $5_2$, $5_3$ or $5_4$, on the other.

The presence of the monomode optical fiber 2 between the coherent light source 1 and the input face 3a of the multimode optical fiber 3 has the advantage of preventing the disturbances which might occur outside zone 4 to be monitored from modifying the speckle on the output face 3b of fiber 3, since the monomode fiber 2 is not influenced by disturbances and since it transmits the light emitted by source 1 directly onto the input face 3a of fiber 3 inside zone 4.

The presence of one or more optical fibers, such as $5_1$, $5_2$, $5_3$ or $5_4$, with a core diameter smaller than that of the multimode fiber 3, between the output of face 3b of fiber 3 on which the speckle appears and the photodetector or photodetectors, such as $6_1$, $6_2$; $6_3$, allows the photodetector or photodetectors to be moved away from the zone to be monitored 4 without disturbing the result of the spectrum analysis relating to the outputs signals, such as $9_1$, $9_2$, $9_3$, under the effect of vibrations or other disturbances occurring in the measurement zone 4 and the photodetector or photodetectors.

As is evident and as it follows moreover from what has gone before, the invention is in no wise limited to those of its modes of application and embodiments which have been more especially considered; it embraces, on the contrary, all variants thereof.

What is claimed is:

1. In a vibration detection device having an optical fiber sensitive element, a coherent light source, photodetecting means and means for analysing the output of the photodetector means, said sensitive element is formed by a single optical fiber of multimode type and it further comprises a monomode optical fiber disposed between the coherent light source and the first end of the multimode optical fiber and at least one optical fiber, whose core diameter is smaller than that of the multimode optical fiber and which is disposed between the other end of the multimode optical fiber, forming the output face thereof and on which a speckle appears, and the photodetector means.

2. The device as claimed in claim 1, wherein said coherent light source is a laser diode.

3. The device as claimed in claim 1, wherein the photodetector means comprise at least one photodetector formed by a semiconductor photodetector diode.

4. The device as claimed in claim 1, wherein the device comprises several optical fibers whose core diameter is smaller than that of the multimode optical fiber, the photodetector means comprising a photodetector disposed opposite the end of each of these optical fiber with reduced core diameter opposite the one facing the output face of the multimode optical fiber.

5. The device as claimed in claim 3, wherein the single photodetector or each photodetector is followed by a preamplifier and a filter cutting off the low frequencies, the single filter or the filters feeding into a frequency analyser.

6. The device as claimed in claim 5, wherein said single filter or each filter is formed by a high-pass filter.

7. The device as claimed in claim 1, wherein the optical fiber of reduced core diameter of at least a portion of the optical fibers of reduced core diameter is formed by one or more monomode fibers.

8. The device as claimed in claim 1, wherein said multimode optical fiber comprises three guided modes.

* * * * *